(No Model.)
V. ROBINSON.
LOCOMOTIVE JOURNAL BOX.
No. 599,151. Patented Feb. 15, 1898.
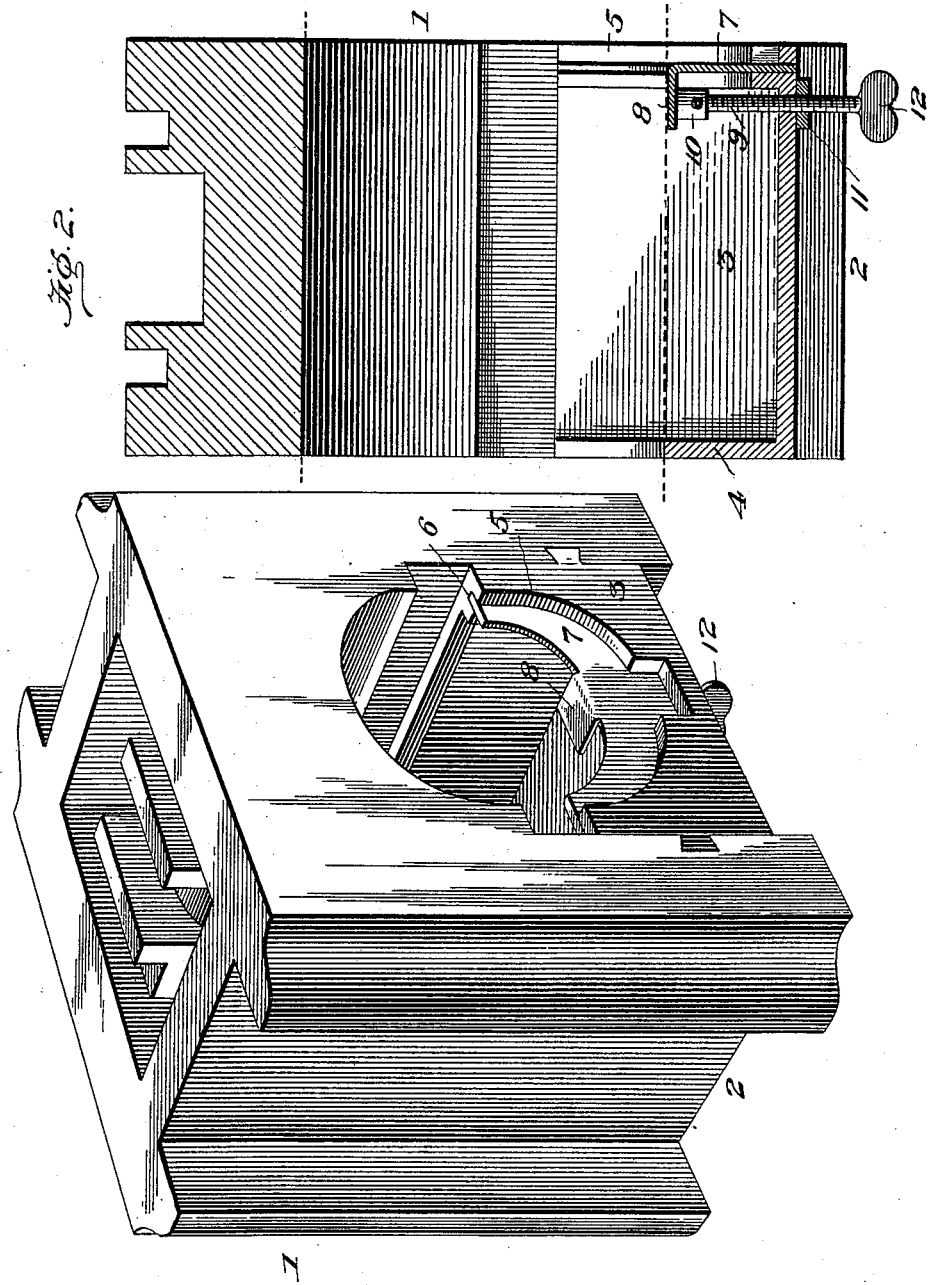
Witnesses
Inventor
_Virgil Robinson_
by H. B. Willson & Co.
Attorneys

UNITED STATES PATENT OFFICE.

VIRGIL ROBINSON, OF NORWICH, NEW YORK.

LOCOMOTIVE JOURNAL-BOX.

SPECIFICATION forming part of Letters Patent No. 599,151, dated February 15, 1898.

Application filed December 1, 1897. Serial No. 660,400. (No model.)

*To all whom it may concern:*

Be it known that I, VIRGIL ROBINSON, a citizen of the United States, residing at Norwich, in the county of Chenango and State of New York, have invented certain new and useful Improvements in Locomotive Journal-Boxes; and I do declare the following to be a full, clear, and exact description of the invention, such as will enable others skilled in the art to which it appertains to make and use the same.

My invention has relation to locomotive journal-boxes, and is more particularly designed to receive and lubricate the drive-shaft of a locomotive.

Heretofore journal-boxes for this purpose have been used in which the oil-box has been provided with an adjustable end wall or slide, whereby access may be had to the journal-box under the drive-shaft for the purpose of removing and inserting lubricating material, such as waste. Some of these oil-boxes have been provided with set-screws for holding the slide closed, while others have been provided with a spring for the same purpose. The set-screws heretofore employed in this connection have been discovered in practice to be objectionable, for they are constantly working loose and being lost, thus allowing the slide to move from its adjusted position and allowing the lubricating material to work from out of the oil-box. In the form of journal-box in which the spring is employed serious objection is experienced by reason of the fact that the springs are subjected to the constant vibration incident to the moving locomotive, thus soon becoming broken or weakened to such an extent as to allow the slide to open the end of the lubricating-box and allow the waste to work out. Furthermore, the spring is influenced by temperature and is generally objectionable in that it is not a positive means for holding the slide in adjustment. It is the object of the present invention to overcome these objections, and to this end I provide the oil-box with a vertically-adjustable slide and a screw for adjusting said slide, the head of the screw being within the box and thereby preventing the screw working out of the box and becoming lost.

With this object in view the invention consists in certain features of construction and combination of parts, which will be hereinafter fully described and claimed.

In the accompanying drawings, Figure 1 is a perspective view of my improved journal-box; and Fig. 2 is a transverse sectional view of the same, showing in dotted lines the locomotive drive-shaft in position.

In said drawings, 1 denotes the journal-box, which is of the usual type, having the lower open end 2.

3 denotes the oil-box, which fits into the journal-box and has a dovetail sliding engagement between the side pieces of the journal-box and is formed with a rigid rear wall 4, which, in connection with the journal-box and brasses, embraces the drive-shaft of the locomotive. The other end of the oil-box is formed with a semicircular recess 5, having a guide-slot 6.

7 denotes a slide which works vertically through the slot 6 and is provided with an inwardly-projecting lip 8.

9 denotes a screw having a head 10, which is adapted to engage the lip and by the rotation of the screw elevate the slide to close the open end of the oil-box.

By reason of the head of the screw being within the box it is evident that should the screw work loose it cannot become disengaged or lost from the box, so that the engineer in examining the locomotive may at all times be able to adjust the slide to close the oil-box, as the screw is always at hand. In order to prevent the screw working loose, I provide a jam-nut 11, and to afford easy means of operating the screw to adjust the slide I provide the lower end of the screw with a button or thumb-piece 12.

From the foregoing description, taken in connection with the accompanying drawings, the construction of the invention will be readily understood without requiring an extended explanation.

When it is desired to remove the old waste and place new waste in the box, the screw is turned so as to allow the slide to lower, thus enabling the old waste to be pulled out and the new inserted. The slide is then raised by rotating the screw in the proper direction, and by clamping the jam-nut in place the waste is completely surrounded and prevented from falling out.

Although I have specifically described the construction and relative arrangement of the several elements of my invention, I do not desire to be confined to the same, as such changes or modifications may be made as clearly fall within the scope of my invention without departing from the spirit thereof.

Having thus described my invention, what I claim, and desire to secure by Letters Patent, is—

1. The combination with a journal-box of the character described, of an oil-box secured in position and provided with a slide, and a screw having an engagement with the bottom of the journal-box and having at its upper end a head to engage and elevate the slide, said head being arranged within the oil-box, whereby its accidental displacement is prevented, substantially as set forth.

2. The combination with a journal-box and its oil-box having one wall cut away and formed with a vertical slot, of a slide having a vertical movement in said slot and formed with a lip, a screw projecting through the bottom of the journal-box and having a head within the oil-box engaging said lip, and a set-nut for holding the screw in adjusted position, substantially as set forth.

In testimony whereof I hereunto affix my signature in presence of two witnesses.

VIRGIL ROBINSON.

Witnesses:
 CLATE ROBINSON,
 BENJ. G. COWL.